Feb. 8, 1949.   H. F. FLOWERS   2,461,263
BRAKING MECHANISM FOR RAIL VEHICLES
Filed May 16, 1946   6 Sheets-Sheet 3

Inventor.
Henry Fort Flowers
Mason, Porter, Diller,
and Stewart.   Attys.
By

Feb. 8, 1949. H. F. FLOWERS 2,461,263
BRAKING MECHANISM FOR RAIL VEHICLES
Filed May 16, 1946 6 Sheets-Sheet 4

Inventor,
Henry Fort Flowers
By Mason, Porter, Diller,
and Stewart attys.

Feb. 8, 1949.   H. F. FLOWERS   2,461,263
BRAKING MECHANISM FOR RAIL VEHICLES
Filed May 16, 1946   6 Sheets-Sheet 5
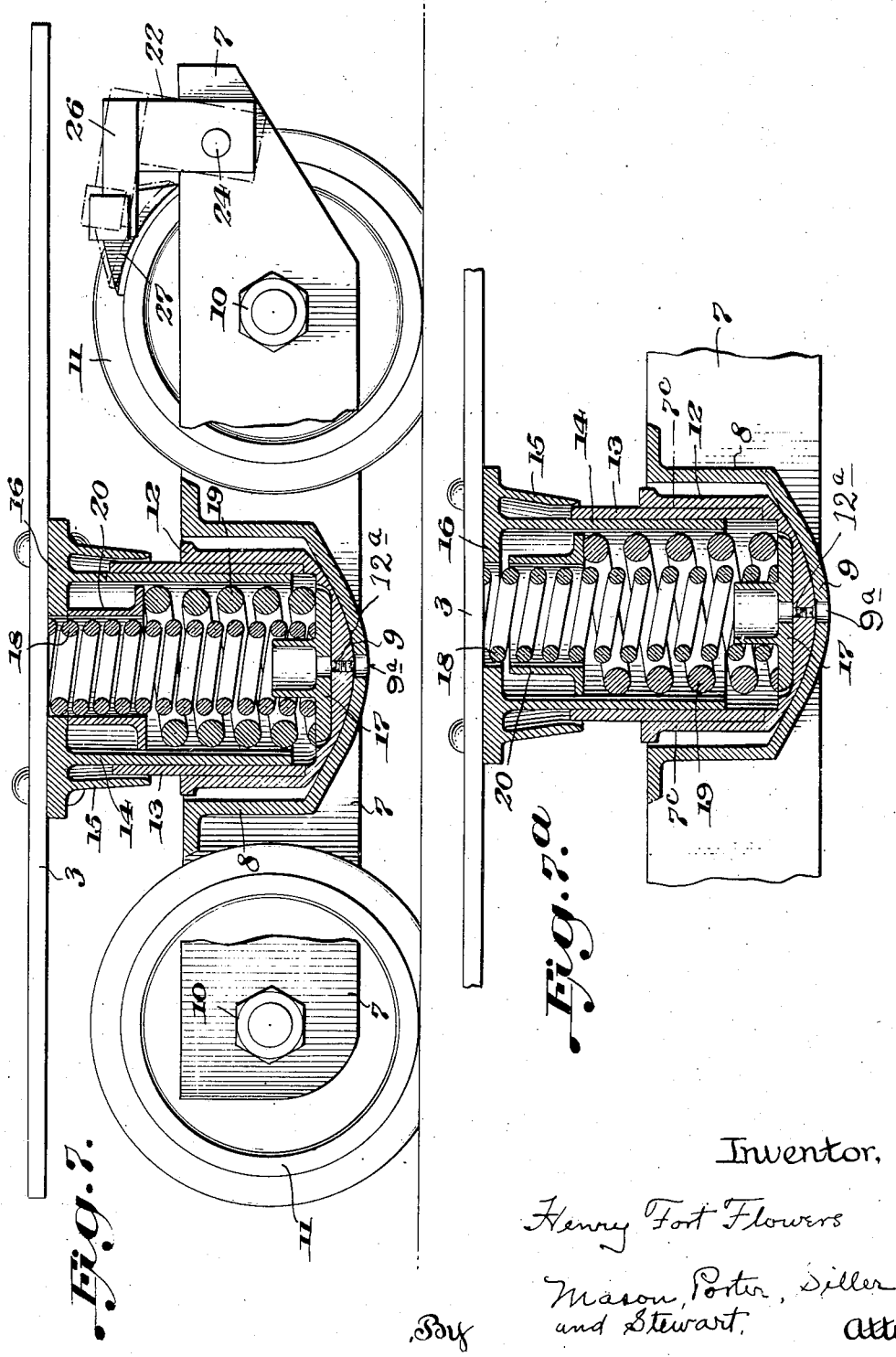
Inventor,
Henry Fort Flowers
Mason, Porter, Diller,
By   and Stewart,   Attys.

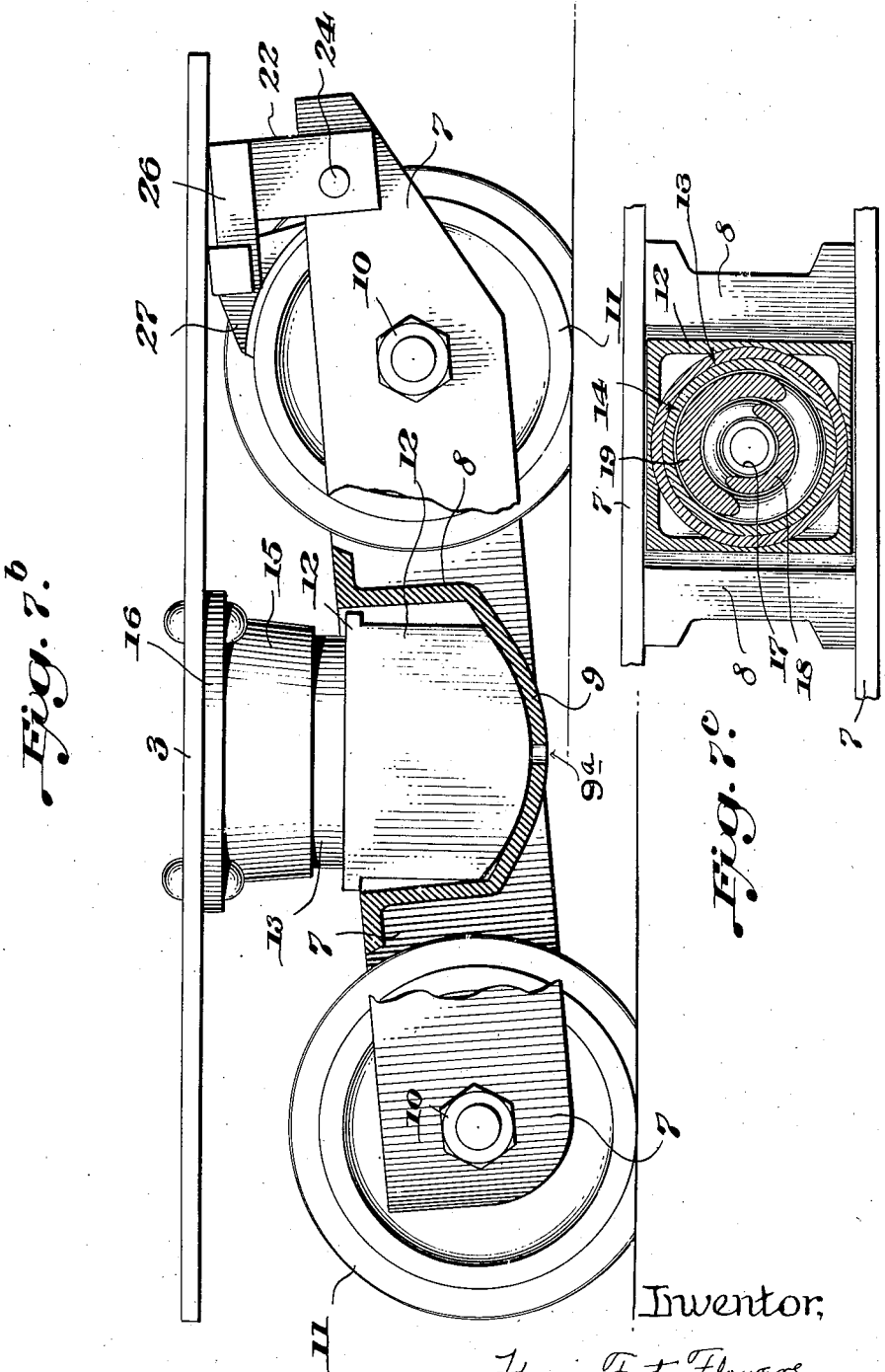

Patented Feb. 8, 1949

2,461,263

UNITED STATES PATENT OFFICE 2,461,263

BRAKING MECHANISM FOR RAIL VEHICLES

Henry Fort Flowers, Findlay, Ohio

Application May 16, 1946, Serial No. 670,148

11 Claims. (Cl. 188—33)

The invention relates to new and useful improvements in a rail vehicle and more particularly to a rail vehicle wherein the body is mounted on axleless trucks, each of which is turnable about a vertical axis, oscillatable on a horizontal axis, and movable vertically relative to the body of the vehicle.

An object of the invention is to provide a vehicle of the above type with a braking mechanism fo reach truck operable from a common source wherein the tie rod connecting opposed trucks by a turning or twisting movement thereof is utilized for operating the brakes.

A further object of the invention is to provide a braking mechanism of the above type wherein the brake shoe associated with each truck is mounted in a brake cage to which the tie rod is connected so as to permit free movement of the truck in a vertical plane.

A further object of the invention is to provide a braking mechanism of the above type wherein the pivotal support for the brake cage is so disposed that the weight of the tie rod tends to move the brake shoe away from the wheel.

A further object of the invention is to provide a braking mechanism of the above type wherein a swivel pin carried by the tie bar for turning the same is so disposed thereon as to move in a circular path when the trucks swing about their vertical axes and the connection of the brake operating link to the actuating lever therefor is disposed at the center of said circular path whereby the trucks are free to swing without disturbing the action of the braking mechanism.

These and other objects will in part be obvious and will in part be hereinafter more fully disclosed.

In the drawings which show by way of illustration one embodiment of the invention, Figure 1 is a plan view of a mine car embodying the improvements with the heavy end plates removed for the purpose of showing the trucks and associated king posts on which the body is mounted;

Figure 7 is a side view of the parts shown in Figure 6, parts being broken away and in section;

Figure 7a is a fragmentary vertical cross sectional view illustrating the light load condition of the spring;

Figure 7b is a view partly in side elevation and partly in section of a truck showing the truck frame as tilted at an angle to the horizontal;

Figure 7c is a sectional view on the line 7c—7c of Figure 7a;

Figure 1:
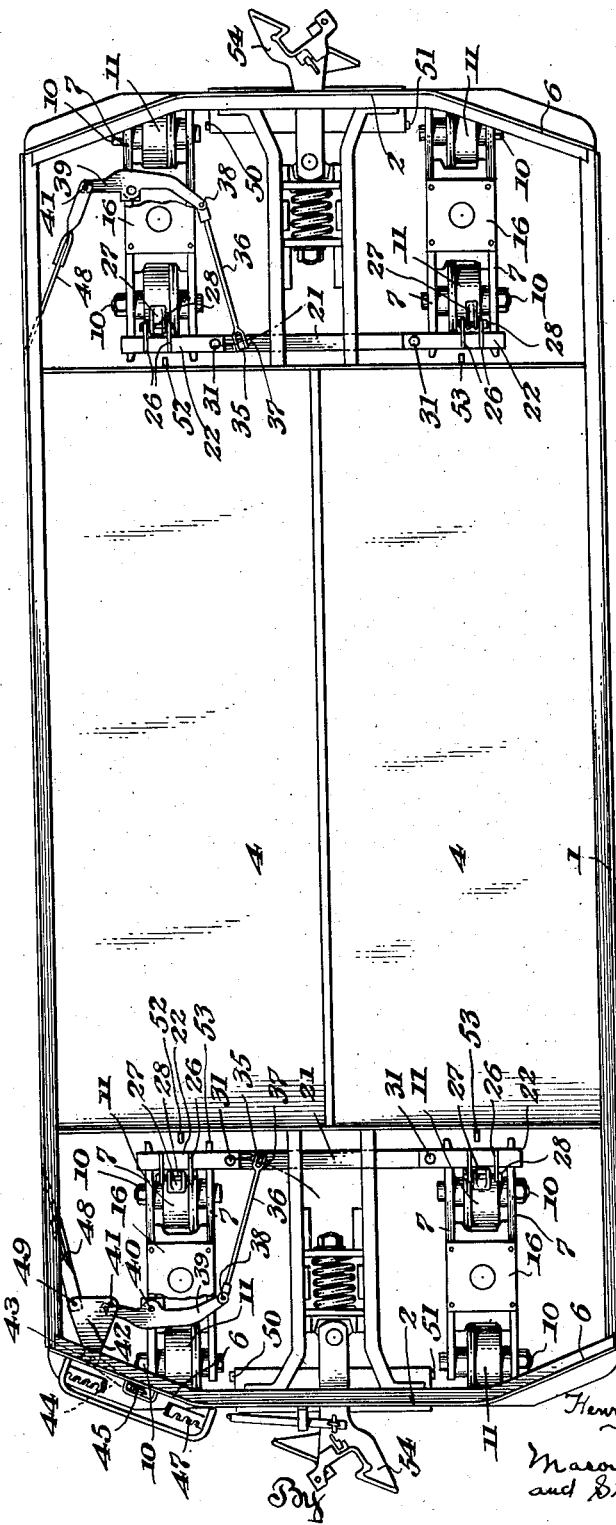

The improved rail car includes a body which is constructed of plates of rectangular shape. These plates are connected by welding and riveting to provide a very rigid body structure. The body includes side plates 1, 1 and end plates 2, 2. There is a heavy end plate 3 extending from one side of the car to the other, beneath which are the supporting trucks for the body. There is a similar heavy end plate at the other end of the car. In between the end plates is a well. The side plates 1, 1 are extended downwardly to form the side plates of the well and floor plates 4, 4 form the bottom of the well and extend from one side thereof to the other. These floor plates 4, 4 are joined to the heavy plates 3 by vertical plates 5. These vertical plates forming the ends of the well serve as transverse beams, having the effect of a Z-bar, with the end floor plate forming one leg of the Z-bar and the well floor plate forming the other leg of the Z-bar. The meeting edges of the plates are connected by folding one of the plates and by welding or riveting the plates together. The end plates are flanged or bent to form beveled corners as indicated at 6, 6 so as to provide room at one side for a brake operating lever and to provide a step at the other side. This provides a body which is very simple in construction and which is of relatively large carrying capacity and at the same time is greatly limited in overall dimensions.

The body is carried by wheel trucks. There are two independently mounted wheel trucks at each end of the car. They are similar in construction and the description of one will answer for the others. Each wheel truck includes side frames 7, 7 which are formed of heavy plates.

These side plates are connected together by transverse angle plates 8, 8 and a semi-cylindrical gimbal supporting plate 9. These plates are welded together and to the side plates, thus making a very rigid wheel frame. There are wheel axles 10, 10 extending from one side of the frame to the other on which are mounted flanged wheels 11, 11. These wheel axles are rigidly connected to the side members and further aid in the forming of a rigid wheel frame structure.

Mounted on the gimbal supporting member 9 is a body supporting member or gimbal 12. This supporting gimbal 12 is provided with parallel flat sides and parallel end members and also a bottom member, all of which are integrally connected. The side members contact with the inner faces of the side frames and guide the gimbal in its shifting movements. The end members are spaced away from the gimbal transverse angle plates 8, 8. Carried by this body supporting member is a hardened steel sleeve 13. The sleeve 13 is cylindrical and is press fitted into the gimbal 12 so as to become a unit therewith. This hardened steel sleeve which is a wear sleeve may be, however, removed and replaced. A king post 14 of hardened steel fits within the sleeve and the sleeve 13, together with the body supporting member and the truck, is free to oscillate on the king post about a vertical axis. The king post can move up and down in the sleeve 13. The king post is also provided with a dust guard 15 to seal the dirt away from the close fit between the king post and the gimbal or body supporting member. The king post 14 and the dust seal 15 are welded to a plate 16 which, in turn, is welded and riveted to the heavy end floor plate 3. The gimbal or body supporting member is curved to conform to the inner face of the gimbal supporting member 9 and the truck frame can shift on this body supporting member and thus oscillate in a longitudinal vertical plane when the wheels are traveling over uneven tracks. Mounted in the body supporting gimbal 12 is an abutment plate 17 provided with a central upstanding hub around which is disposed a coil spring 18.

Outside of the coil spring 18 is a heavy spring 19. The upper end of the light spring bears against the floor plate 3 and the upper end of the heavy spring bears against an abutment sleeve 20 which in turn bears against the plate 16. These springs are so dimensioned that under light load the body will be supported on the light spring and the heavy spring abutment sleeve will be out of engagement with the plate 16. This light load condition of the springs is shown in Figure 7a. When a heavy load is carried, then both springs function to support the body, as shown in Figure 7.

From the above it will be apparent that the body is so mounted on the wheel trucks that the trucks may have three motions. One, they may swing about a vertical axis when passing around curves; two, they may oscillate in a vertical plane when traveling over uneven tracks; and three, the body may move vertically under spring control relative to the trucks. As noted, the wheels are in tandem on each truck and are flanged so that the front wheel of the outside truck, when following a curved track leading to the left, will turn the truck about a vertical axis so that it will follow the curved track. The opposed trucks at each end of the car are connected by a tie bar 21 so that the turning movement of one truck about a vertical axis will be imparted to the opposed truck.

The mounting for the truck described above is shown, described and claimed in my copending application Serial No. 660,990 filed April 10, 1946.

Mounted on the side frames 7, 7 is a brake shoe cage including a supporting bracket 22. This bracket is provided with depending members 23, 23 at one end thereof which members are pivotally connected to the side member by a pivot bolt 24. There are also depending members 25, 25 at the other end of the brake shoe bracket which are likewise pivoted to the other side member of the truck frame. The brake supporting bracket has parallel spaced arms 26, 26 rigidly attached thereto, which arms carry a brake shoe 27 which is mounted on a pivot bolt 28 extending through the arms 26, 26.

The brake shoe bracket 22 has laterally extending members 29, 29 and the tie bar is connected to the brake shoe bracket by means of a pin 30 having tapered ends 31, 32 which fit the upper and lower members 29, 29 of the brake shoe bracket. This pin 30 is hardened and engages a bushing 33 which is mounted in the tie bar and a rubber seal 34 is provided at each end of the bushing to prevent water and dust from working into the connection between the pin and the bushing.

This universal connection between the tie bar and the brake shoe enables the tie bar to move endwise and thus impart the movements of one truck to the other without interfering with the independent movements of the trucks in vertical planes. It also permits the tie bar to be oscillated or twisted for swinging the brake shoe bracket on its pivotal support, thus moving the brake shoes into and out of engagement with the wheels. As a means for turning the tie bar about an axial line intersecting the pivots 24 a swivel pin 35 is located in the tie bar adjacent one end thereof. A link 36 is connected at 37 to the upper end of this swivel pin and is connected at 38 to a brake operating lever 39 fulcrumed at 40 on the floor plate 3. This lever 39 is pivoted at 41 to a triangular shaped plate 42. The triangular shaped plate 42 is connected at 43 to a link 44 which in turn is connected to a hand operated lever 45. This hand operated lever is pivoted at 46 and is adapted to engage a toothed rack 47 which holds the lever in a set position.

The braking mechanism applied to the truck at the rear end of the body is similar in construction to that which has been described above in connection with the trucks at the front end of the body and similar reference letters have been applied thereto. The lever 39 of the rear braking mechanism is connected to a rod 48 which extends along the side of the car and is pivoted at 49 to the plate 42. When the hand lever is operated for setting the brakes it will swing the plate 42 either on the pivot pin connection 41 to the brake lever 39 as a fulcrum, or on the pivot pin 49 connecting the plate 42 to the rod 48. One or the other of the brake shoes may be pressed against the rim of its associated wheel and this will become a fulcrum so that the other brake shoe will be pressed against the rim of its associated wheel. By this arrangement a uniform pressure of the brake shoes on the rims of the wheels can be obtained. It is noted that the pivot pins joining the brake shoe supporting bracket to the wheel frame are so disposed that the center of gravity of the tie bar and the brake cage as a whole is toward the center of the car relative to this pivotal connection, and, therefore, the brake shoes tend to stand clear of the wheel by the action of gravity on the tie bar.

Figure 2:
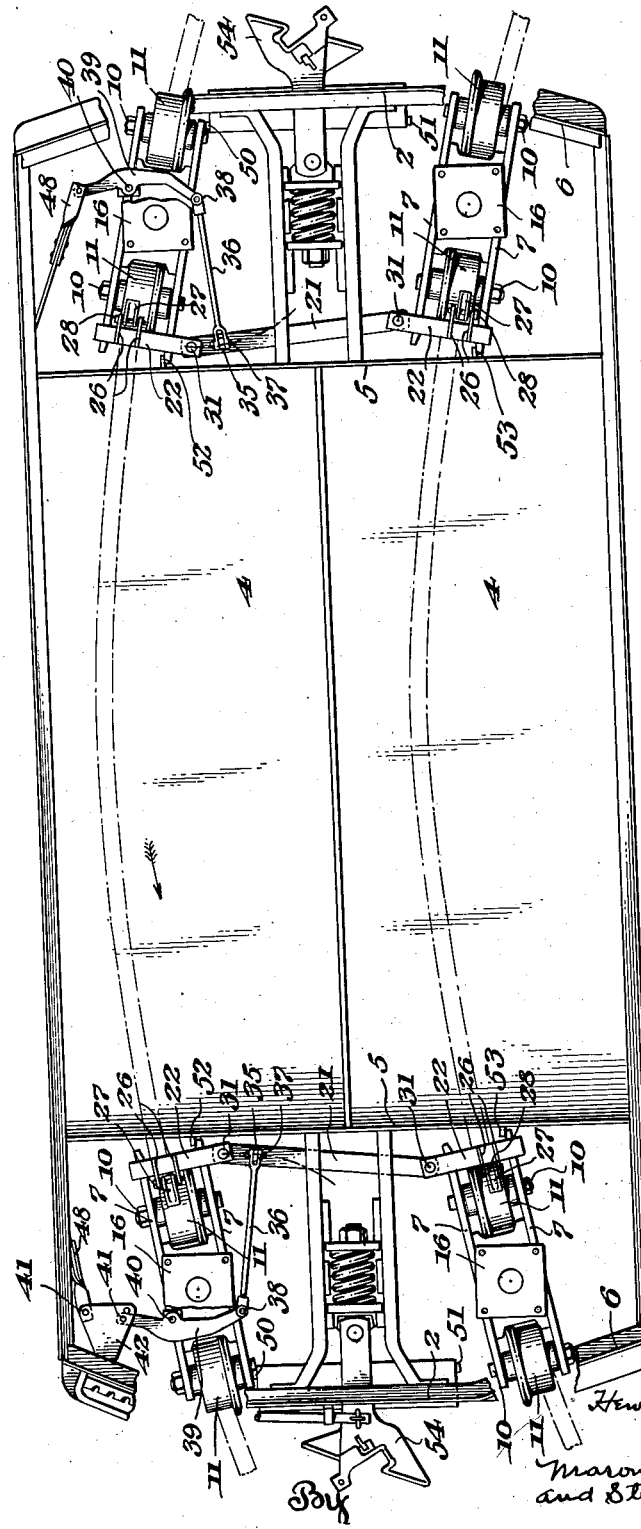
Figure 2 is a view similar to Figure 1 but showing the trucks as turned on a vertical axis for following a curved track.
Figure 3:
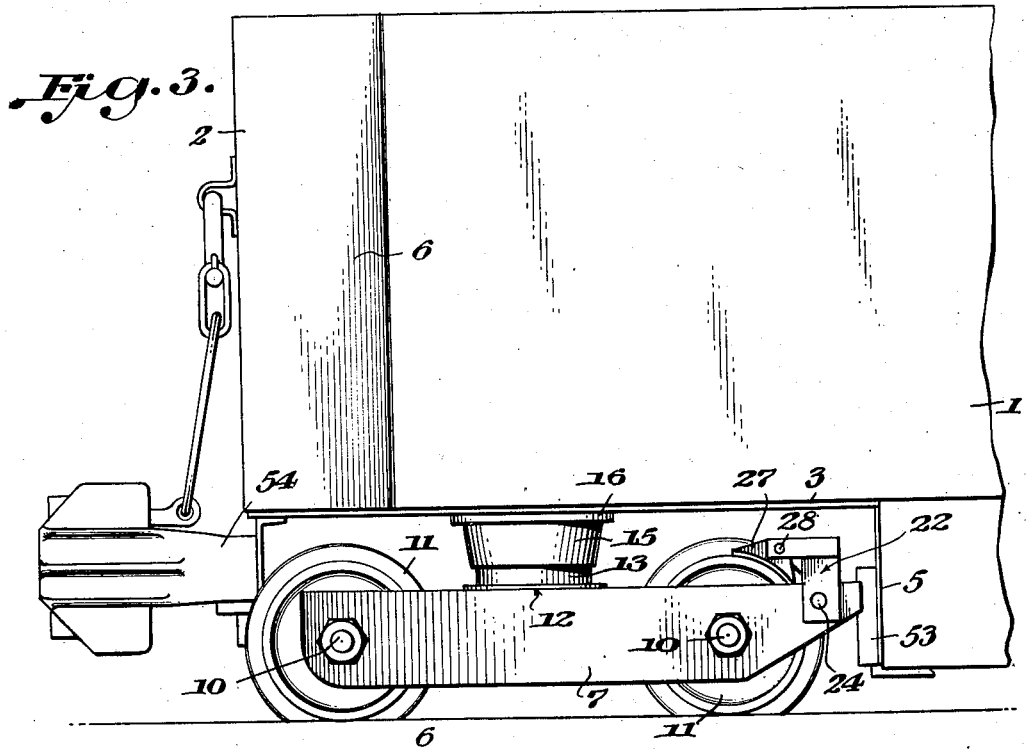
Figure 3 is a side view of one end of the mine car.
Figure 4:
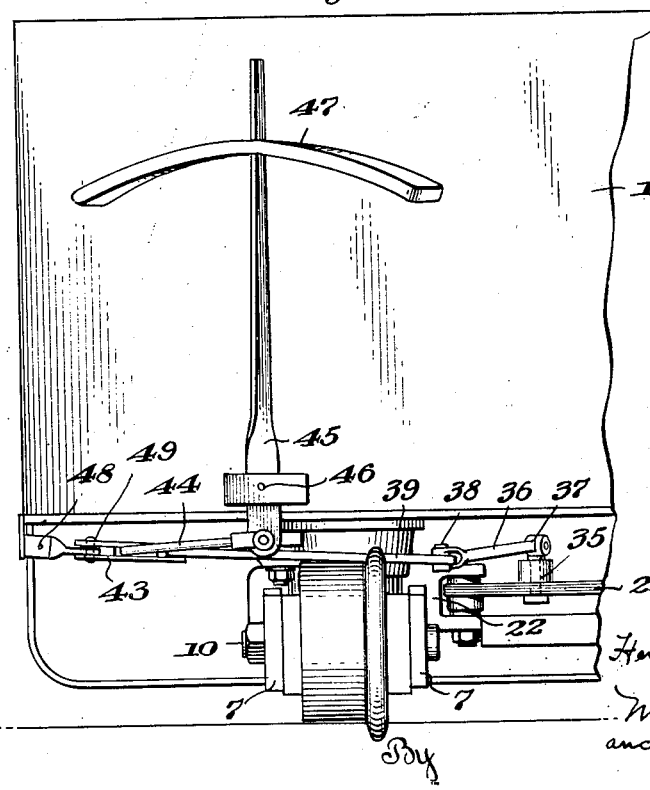
Figure 4 is a partial end view of the mine car.
Figure 5:
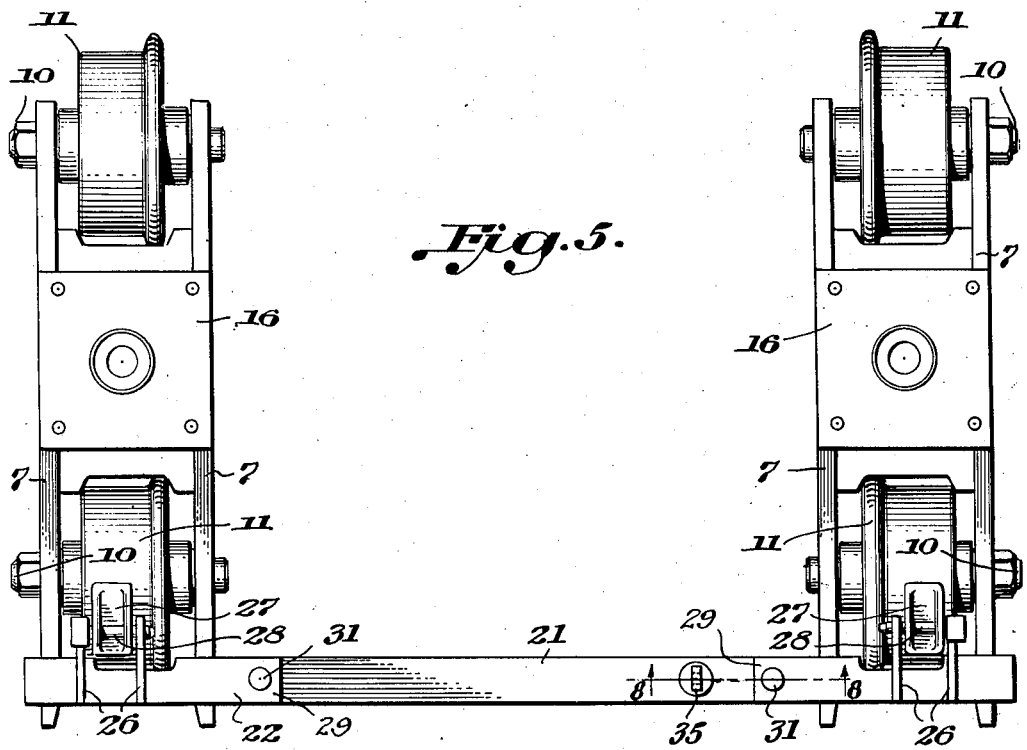
Figure 5 is a view of the opposed trucks at one end of the car on which the body is mounted and also showing the tie bar connecting the trucks and the brake mechanism.
Figure 6:
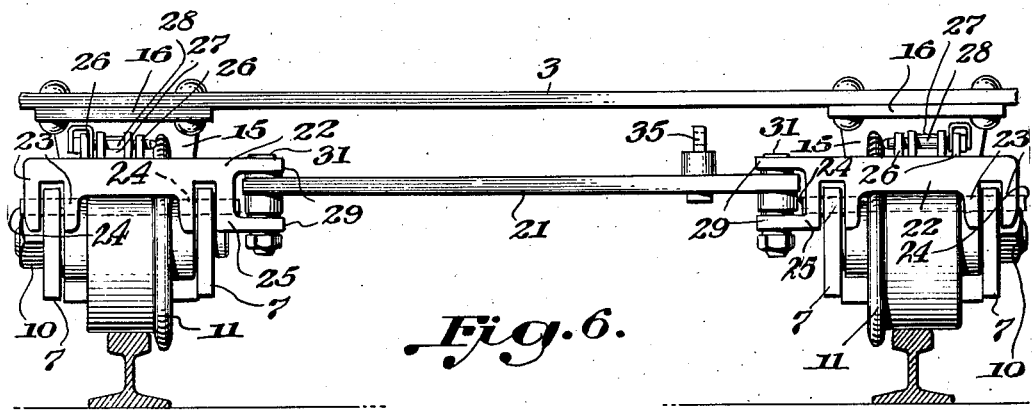
Figure 6 is an end view of the trucks showing the brake cage and its mounting on the wheel truck frame and the tie bar connecting the same, and also showing the heavy floor plate on which the king posts are mounted.
Figure 8:
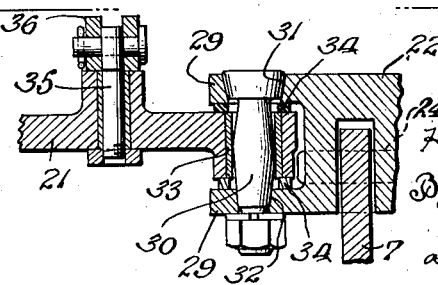
Figure 8 is a sectional view on the line 8—8 of Figure 5 showing on an enlarged scale the connection between the tie bar and the brake supporting bracket and also showing the connection to the tie bar for twisting the same to operate the brakes.

It is also noted that the tie bar is relatively short. As the trucks follow the curved track the cantilever swivel pin describes a definite circular path and the center of this circular path determines the normal location of the connection between the link 36 and the lever 39. In Figures 1 and 2 of the drawings this curved path is shown in dotted lines and the link 36 in Figure 1 is at the center of its lateral travel, while in Figure 2 it is in one extreme of its lateral swing. The swinging of the trucks, therefore, does not in any way bring about a twisting movement of the tie bar.

The brake lever 45 is made of spring steel so that it will provide flexibility to the application of the brakes and permit the operator to tighten the brakes to the desired amount even when the notches in the plate 47 are spaced a limited distance from each other. This springing of the brake lever compensates for any slight errors which occur in the construction of the brake rigging and various movements of the truck frames. The trucks are free to travel from a tangent track to a curved track, and vice versa. They are also free to oscillate in a vertical plane without affecting the braking mechanism and at the same time the brakes may be applied equally efficiently when the car is traveling on a tangent track or on a curved track.

In order to limit the turning movements of the trucks on their vertical axes, stops 50 and 51 are provided on the under side of the body against which the inner side frame of the truck contacts for limiting the inward turning of the trucks. There are also stops 52 and 53 mounted on the body plate 5 which are engaged by the ends of the side members of the wheel frame which likewise limit the turning movements of the trucks about vertical axes. When the mine car is traveling around a curve, as indicated in Figure 2, the flange of the forward wheel of the outside truck engages the outer rail and guides the car around the curve which may be of a very short radius. The wheel frame will be limited in its turning movement when it contacts with the stop 50. The centrifugal force of the car body transmitted to the truck frame through the king post tends to force the flange of the rear wheel of the outside truck against the rail. However, the truck frame of the inside truck will engage a stop 53 and this will have the effect of centering the rear wheels of the opposed truck in relation to the rails. The tie bar is relatively short and will swing the inside truck to a slightly greater angle than the outside truck. This further aids in maintaining the wheels of the inside truck in proper engagement with the inside rail.

When traveling around a very sharp radius curve at slow speed, the wheels adjacent the well or center section of the car tend to travel in a plane that is perpendicular to the wheel spindles. The rear wheels on the leading trucks tend to roll toward the inner rail, while the wheels adjacent the well on the trailing end of the car, that is, the leading wheels of the rear trucks, tend to roll away from the inner rail. The stops associated with the rear trucks prevent said trucks from swinging through too great an angle so as to prevent the leading wheel on the rear truck from dropping between the rails.

It will be noted that there is an opening 9a in the support 9 for the gimbal which is for the purpose of permitting any foreign material to sift out of the gimbal support instead of accumulating in the bottom thereof. When the dirt accumulates in the bottom of the pocket formed by the gimbal supporting member, it is apt to lift the gimbal off its seat. This seat is cylindrical and the horizontal axis thereof extends transversely with respect to the track and holds the wheels in a vertical plane of rotation. Dirt accumulating on the seat is likely to cause the top of the wheel to lean outward. It will also be noted that means is provided for supplying oil to the interior of the gimbal. This is accomplished by the opening in the stool for the spring and an opening in the bottom of the gimbal which preferably has a valve for controlling the lubrication.

The operation of my improved brake actuating mechanism is thought to be clear from the detailed description given above. It is noted, however, that there is a brake shoe associated with each truck and that all of the brake shoes may be moved into gripping engagement with the wheels by a single manually operated lever. The mechanism interposed between the operating lever and the brake shoes includes the tie bar connecting opposed trucks and the setting and releasing of the brakes is accomplished by a turning movement of the tie bar which is so connected to the brake supporting cages and to the actuating lever therefor that the trucks may swing on their vertical axes without in any way disturbing the action of the braking mechanism and likewise the connection between the tie bars and the brake cages is of a nature which permits the trucks to move independently in vertical planes. The brake actuating mechanism has been greatly simplified by including the tie bar as an element thereof, and, at the same time, this functioning of the tie bar in the braking mechanism does not in any way interfere with the movements of the wheel trucks.

It is obvious that many changes may be made in the details of construction and the arrangement of the parts without departing from the spirit of the invention as set forth in the appended claims.

I claim:

1. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage pivotally mounted on each wheel frame for swinging movement in the plane of the wheel with which it is associated, a brake shoe carried thereby, each brake cage having a rigid arm projecting inwardly from the truck frame, a tie bar pivotally connecting the opposed brake cage arms whereby horizontal turning movements of one wheel truck are imparted to the opposed wheel truck, and means connected to said tie bar for turning the same for swinging the brake cages on its pivotal mounting and moving the brake shoes into and out of contact with the wheels.

2. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage pivotally mounted on each wheel frame for swinging movement in the plane of the wheel with which it is associated, a brake shoe carried thereby, each brake cage having a rigid arm projecting inwardly from the truck frame, a tie bar pivotally connecting the opposed brake cage arms whereby horizontal turning movements of one wheel truck are imparted to the opposed wheel truck, a swivel pin carried by said tie bar and projecting at right angles therefrom, a brake actuating lever mounted on said body, a link pivotally connecting the swivel pin with said lever and manual means for oscillating the lever for turning the tie bar for swinging the brake cages in their pivotal mountings.

3. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage mounted on each wheel frame for swinging movement in the plane of the wheel with which it is associated, a brake shoe carried thereby, each brake cage having a rigid arm projecting inwardly from the truck frame, a tie bar pivotally connecting the opposed brake cage arms whereby horizontal turning movements of one wheel truck are imparted to the opposed wheel truck, a swivel pin carried by said tie bar and disposed thereon so as to move in a circular path when the wheel trucks turn on their vertical axes, a brake actuating lever pivotally mounted on said body, a link connecting the swivel pin to said brake lever, the pivotal connection between the link and the brake lever being disposed substantially at the center of the curved path of travel of the swivel pin, and manual means for actuating said brake lever.

4. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage mounted on each wheel frame for swinging movement in the plane of the wheel with which it is associated, a brake shoe carried thereby, each brake cage having a rigid arm projecting inwardly from the truck frame, a tie bar pivotally connecting the opposed brake cage arms whereby horizontal turning movements of one wheel truck are imparted to the opposed wheel truck, a swivel pin carried by said tie bar and projecting at right angles therefrom, a brake actuating lever mounted on the floor plate of the body, a link connecting said lever with said swivel pin, a hand-operated lever pivoted intermediate its ends, devices for connecting the lower end of said hand-operated lever with the brake actuating lever, a rack bar having notches adapted to receive said hand-operated brake lever, said hand-operated lever being of spring metal and dimentioned so as to yield to compensate for various motions of the truck frames.

5. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage mounted on each wheel frame for swinging movement in the plane of the wheel with which it is associated, a brake shoe carried thereby, each brake cage having a rigid arm projecting inwardly from the truck frame, a tie bar pivotally connecting the opposed brake cage arms whereby horizontal turning movements of one wheel truck are imparted to the opposed wheel truck, each pivotal connection between the tie bar and the brake cage arm including a hardened bushing and a tapered pin for permitting free and independent movement of the wheel frames in a vertical plane.

6. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage including a supporting bracket, a brake shoe carried thereby, means for pivotally connecting said bracket to the wheel frame adjacent one of the wheels thereof, said bracket having projecting arms extending inwardly from the wheel frame, a tie bar pivotally connected to the inwardly projecting arms of opposed wheel trucks whereby horizontal turning movements of one wheel truck are imparted to the opposed wheel truck, the pivotal connection between each brake cage and the tie bar including a hardened bushing and a tapered pin which permits independent movements of the wheel trucks in vertical planes, and means connected to the tie bar for turning the same for swinging the supporting brackets for moving the brake shoes into and out of contact with the wheel.

7. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage including a supporting bracket, a brake shoe carried thereby, means for pivotally connecting said bracket to the wheel frame adjacent one of the wheels thereof, said bracket having projecting arms extending inwardly from the wheel frame, a tie bar pivotally connected to the inwardly projecting arms of opposed wheel trucks whereby horizontal turning movements of one wheel truck are imparted to the opposed wheel truck, the pivotal connection between each brake cage and the tie bar including a hardened bushing and a tapered pin which permits independent movements of the wheel trucks in vertical planes, said tie bar having a swivel pin mounted therein adjacent one of the wheel trucks and projecting at right angles therefrom, a brake actuating lever mounted on said vehicle body, a link connecting said actuating lever with the swivel pin, and manual means for swinging said lever.

8. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage including a supporting bracket, a brake shoe carried thereby, means for pivotally connecting said bracket to the wheel frame adjacent one of the wheels thereof, said bracket having projecting arms extending inwardly from the wheel frame, a tie bar pivotally connected to the inwardly projecting arms of opposed wheel trucks whereby horizontal turning movements of one wheel truck are imparted to the opposed wheel truck, the pivotal connection between each brake cage and the tie bar including a hardened bushing and a tapered pin which permits independent movements of the wheel trucks in vertical planes, said tie bar having a swivel pin mounted therein adjacent one of the wheel trucks and projecting at right angles therefrom, a brake actuating lever mounted on said vehicle body, a link connecting said actuating lever with the swivel pin, and manual means for swinging said lever, said swivel pin being so disposed on said tie bar as to move in a circular path and said pivotal connection between the link and the actuating lever being substantially at the center of said circular path.

9. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage mounted on each wheel frame, and including a supporting bracket, a brake shoe carried thereby, said supporting bracket being pivoted to the wheel frame, arms projecting inwardly from said supporting bracket, a tie bar pivotally connected to said inwardly projecting arms whereby horizontal turning movements of one wheel truck are imparted to the opposed wheel truck, means connected to the tie bar for turning the same for swinging the brake shoes into and out of contact with the wheels, the pivotal connection of the supporting bracket being so disposed relative to the projecting arms and the tie bar that the weight of the tie bar tends to turn the supporting bracket to move the shoes away from the wheels.

10. A rail vehicle comprising a body, opposed independent wheel trucks at each end of said body for supporting the same, each wheel truck including a wheel frame on which wheels are mounted in tandem, supporting means between each wheel frame and the body permitting the wheel frame to swing about a vertical axis, to oscillate in the plane of the wheels, and to move bodily vertically relative to the body, a brake cage mounted on each wheel frame for swinging movement in the plane of the wheel with which it is associated, a brake shoe carried thereby, each brake cage having a rigid arm projecting inwardly from the truck frame, a tie bar pivotally connecting the opposed brake cage arms whereby horizontal turning movements of one wheel truck are imparted to the opposed wheel truck, a swivel pin carried by each tie bar connecting the opposed trucks, a brake actuating lever associated with each swivel pin, a floating member to which said brake actuating levers are separately connected, and manual means connected to said member for oscillating the same for moving first one tie bar and then the other for setting the brakes.

11. A rail vehicle comprising a body, opposed independent wheel trucks on which said body is mounted, each wheel truck including a wheel frame on which wheels are mounted in tandem, supporting means between each wheel frame and the body permitting the wheel frame to swing about a vertical axis to oscillate in the plane of the wheels and to move bodily vertically relative to the body, a brake cage pivotally mounted on each wheel frame for swinging movement in the plane of the wheel with which it is associated, a brake shoe carried thereby, each brake cage having a rigid arm projecting inwardly from the truck frame, a tie bar pivotally connecting the opposed brake cage arms whereby horizontal turning movements of one wheel truck are imparted to the opposed wheel truck, and means for swinging each brake shoe cage on its pivotal mounting for moving the brake shoes carried thereby into and out of contact with the wheels.

HENRY FORT FLOWERS.

REFERENCES CITED

The following references are of record in the file of this patent:

UNITED STATES PATENTS

| Number | Name | Date |
|---|---|---|
| 1,092,814 | Kellogg | Apr. 7, 1914 |
| 2,063,545 | Flowers | Dec. 8, 1936 |
| 2,250,554 | Schroeder | July 29, 1941 |